United States Patent
Leem

(10) Patent No.: US 10,461,426 B2
(45) Date of Patent: Oct. 29, 2019

(54) WIRELESS ANTENNA FOR WIRELESS CHARGING AND NFC COMMUNICATION AND WIRELESS TERMINAL TO WHICH SAME IS APPLIED

(71) Applicant: LG INNOTEK CO., LTD., Seoul (KR)

(72) Inventor: Sung Hyun Leem, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/011,282

(22) Filed: Jun. 18, 2018

(65) Prior Publication Data

US 2018/0301786 A1     Oct. 18, 2018

Related U.S. Application Data

(63) Continuation of application No. 15/742,409, filed as application No. PCT/KR2016/007303 on Jul. 6, 2016.

(30) Foreign Application Priority Data

Jul. 6, 2015 (KR) .................. 10-2015-0096051

(51) Int. Cl.
*H01Q 7/00* (2006.01)
*H01Q 1/38* (2006.01)
(Continued)

(52) U.S. Cl.
CPC .............. *H01Q 7/00* (2013.01); *H01Q 1/22* (2013.01); *H01Q 1/24* (2013.01); *H01Q 1/38* (2013.01); *H04B 5/00* (2013.01)

(58) Field of Classification Search
CPC ............ H01Q 1/24; H01Q 1/521; H01Q 7/00; H01Q 7/06; H04B 5/0025; H04B 5/0031;
(Continued)

(56) References Cited

U.S. PATENT DOCUMENTS

2014/0210406 A1  7/2014  Na et al.
2015/0054455 A1  2/2015  Kim et al.
(Continued)

FOREIGN PATENT DOCUMENTS

CN   103165971 A   6/2013
CN   103326473 A   9/2013
(Continued)

OTHER PUBLICATIONS

Lucic, "Google's Nexus 6 Gets Torn Apart by iFixit, Here's a Look Inside", Android Headlines, https://www.androidheadlines.com/2014/11/googles-nexus-6-gets-torn-apart-by-ifixit-heres-a-look-inside.html, Nov. 24, 2014, pp. 1-7.
(Continued)

*Primary Examiner* — Robert Karacsony
(74) *Attorney, Agent, or Firm* — Birch, Stewart, Kolasch & Birch, LLP

(57) ABSTRACT

A wireless antenna including a wireless communication antenna including a first wireless communication coil and a second wireless communication coil; and a wireless charging antenna including a wireless charging coil. In addition, the wireless charging coil is disposed inside the first wireless communication coil, and the second wireless communication coil is disposed inside the wireless charging coil; the wireless communication antenna further includes a coil connection member traversing the wireless charging coil so as to interconnect the first wireless communication coil and the second wireless communication coil; and a number of windings of the second wireless communication coil is less than a number of windings of the first wireless communication coil.

55 Claims, 7 Drawing Sheets

(51) Int. Cl.
*H04B 5/00* (2006.01)
*H01Q 1/22* (2006.01)
*H01Q 1/24* (2006.01)

(58) Field of Classification Search
CPC .... H04B 5/0037; H04B 5/005; H04B 5/0075; H04B 5/0081; H04B 5/0087; H04B 5/0093
See application file for complete search history.

(56) References Cited

U.S. PATENT DOCUMENTS

| | | | |
|---|---|---|---|
| 2015/0077296 | A1 | 3/2015 | An et al. |
| 2015/0381239 | A1* | 12/2015 | Shostak ............... H04B 5/0037 455/41.1 |
| 2017/0040105 | A1* | 2/2017 | Peralta ................... H01Q 7/00 |

FOREIGN PATENT DOCUMENTS

| | | |
|---|---|---|
| CN | 103414005 A | 11/2013 |
| CN | 104040835 A | 9/2014 |
| CN | 104321928 A | 1/2015 |
| CN | 104364968 A | 2/2015 |
| CN | 204289689 U | 4/2015 |
| EP | 2804290 A1 | 11/2014 |
| EP | 2830152 A1 | 1/2015 |
| KR | 10-2013-0015618 A | 2/2013 |
| KR | 10-2013-0039659 A | 4/2013 |
| KR | 10-2013-0045306 A | 5/2013 |
| KR | 10-2014-0053758 A | 5/2014 |
| KR | 10-2014-0056606 A | 5/2014 |
| KR | 10-1467706 B1 | 12/2014 |
| KR | 10-1505456 B1 | 3/2015 |
| KR | 10-1843897 B1 | 3/2018 |

OTHER PUBLICATIONS

Lee et al, "Multi-functional high-isolation dual antenna for controllable wireless charging and NFC communication," Electronic Letters, vol. 50, No. 13, Jun. 19, 2014, pp. 912-913.

* cited by examiner

WIRELESS ANTENNA FOR WIRELESS CHARGING AND NFC COMMUNICATION AND WIRELESS TERMINAL TO WHICH SAME IS APPLIED

CROSS-REFERENCE TO RELATED APPLICATIONS

This Application is a Continuation of co-pending application Ser. No. 15/742,409, filed on Jan. 5, 2018, which is the National Phase of PCT International Application No. PCT/KR2016/007303 filed on Jul. 6, 2016, which claims the benefit under 35 U.S.C. § 119(a) to Korean Patent Application No. 10-2015-0096051 filed on Jul. 6, 2015, all of which are hereby expressly incorporated by reference into the present application.

BACKGROUND OF THE INVENTION

Field

This disclosure relates to a wireless antenna, and more particularly, to a wireless antenna capable of simultaneously supporting wireless charging and near field communication (NFC) and a wireless terminal to which the same is applied.

Discussion of the Background Art

Due to the development of mobile communication and information processing technologies, smart phones provide various wireless Internet services such as content services as well as video telephony. Such smart phones use near-field communication (NFC) technology to provide the aforementioned services.

NFC technology is non-contact near-field wireless communication using a frequency band of 13.56 MHz and is a communication technology that transmits data bidirectionally between terminals within a distance of 10 cm or less.

Moreover, design technologies for wireless antennas are evolving such that, in recent smart phones, a loop antenna having a wireless charging function and a loop antenna having the above-mentioned NFC function are provided together in order to enhance user convenience.

Wireless charging is non-contact charging in which charging is achieved simply by placing a smartphone on or near a charger. As a wireless charging method, a magnetic-induction method, a magnetic-resonance method, and an electromagnetic-wave method may be mentioned, and among these, the magnetic-induction method has recently attracted attention.

However, in the related art, since a very small smartphone has had to be provided with a loop antenna that supports magnetic induction wireless charging and a loop antenna that supports NFC, charging efficiency may be reduced or NFC recognition efficiency may be deteriorated due to interference between the two loop antennas.

SUMMARY

To overcome the problem described above, one object of this disclosure is to provide a wireless antenna designed such that a loop antenna that supports an NFC function is added inside a loop antenna that supports wireless charging, and a wireless terminal to which the same is applied.

In addition, another object of this disclosure is to provide a wireless antenna designed by optimizing the distance between a loop antenna for wireless charging and an additional loop antenna having an NFC function, and a wireless terminal to which the same is applied.

According to one embodiment of this disclosure, there is provided a wireless antenna including a near field communication (NFC) antenna including a first coil member and a second coil member each including at least one first loop pattern, and a charging antenna including an induction coil member including at least one second loop pattern formed between the first coil member and the second coil member and a coil periphery member configured to form an inner periphery of the induction coil member.

The NFC antenna may further include a coil connection member connected to one side of an inner surface of the first coil member and to one side of an outer surface of the second coil member.

The second coil member may include inner turns, a number of which is determined within a range satisfying a resistance (R) value or a quality factor (Q) value, which is defined in standards of a Wireless Power Consortium (WPC) and a Power Matters Alliance (PMA).

The second coil member may include one inner turn.

The second coil member and the coil periphery member may have a distance therebetween, which is determined within a range satisfying the R value or the Q value.

The R value may range from 4Ω to 6Ω, and the Q value may range from 23 to 27.

The distance between the second coil member and the coil periphery member may range from 40 μm to 70 μm.

The NFC antenna may further include a first longitudinal end of the first coil member configured to extend from one side of the inner surface of the first coil member.

The second coil member may be formed so that a second longitudinal end terminal formed on a longitudinal end of the first loop pattern thereof is in electrical contact with the longitudinal end terminal.

Each of the first loop pattern and the second loop pattern may be formed as a spiral loop pattern.

According to another embodiment of this disclosure, there is provided a wireless terminal including a wireless antenna configured to simultaneously support wireless charging and near field communication (NFC), a flexible printed circuit board (FPCB) on which the wireless antenna is mounted, a battery configured to store therein electric power generated in the wireless antenna, and an NFC chip configured to supply electric power to the NFC antenna so as to transmit and receive communication data to and from the NFC antenna.

Each of the first loop pattern and the second loop pattern may be formed as a spiral loop pattern.

The wireless antenna may be bent so as to be divided and formed on two surfaces of the flexible printed circuit board.

As described above, in the embodiments, a first coil member and a second coil member, which support near field communication (NFC), are formed inside and outside of an induction coil member, which supports wireless charging, and are connected to each other, whereby wireless charging may be achieved and increased NFC recognition efficiency may be achieved.

In addition, when the distance between the second coil member and a coil periphery member is determined or the number of inner turns of the second coil member is optimally determined within a range satisfying a resistance (R) value or a quality factor (Q) value defined in standards of the WPC and the PMA, interference therebetween may be suppressed.

Accordingly, when interference is suppressed, this may result in an increase in wireless charging efficiency and NFC recognition efficiency.

DETAILED DESCRIPTION OF THE EMBODIMENTS

Terms described below in this specification are merely used to describe specific embodiments, and the embodiments should not be limited by these terms. For example, the terms "first coil member" and "second coil member" are used to distinguish one element from another element.

Moreover, the term "and/or" used in this specification should be understood as including any arbitrary and all possible combinations of one or more of the associated listed items.

Hereinafter, embodiments disclosed herein will be described in detail with reference to the accompanying drawings, and the same reference numbers will be used throughout the drawings to refer to the same or like parts, and a repeated description thereof will be omitted.

<Embodiment of Wireless Antenna>

Figure 1:
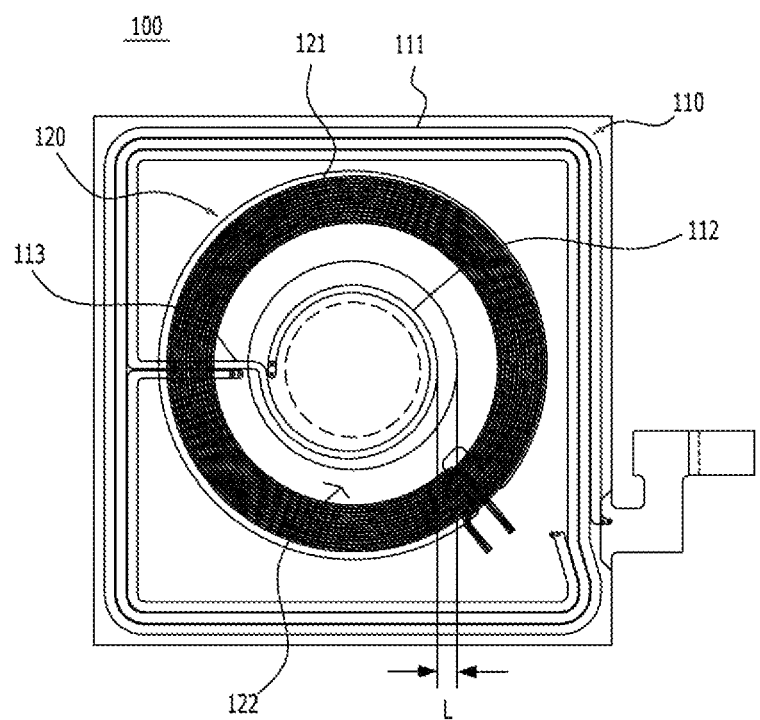
FIGS. 1 and 2 are cross-sectional views respectively illustrating an example of the antenna structure of a wireless antenna according to an embodiment.
Figure 2:
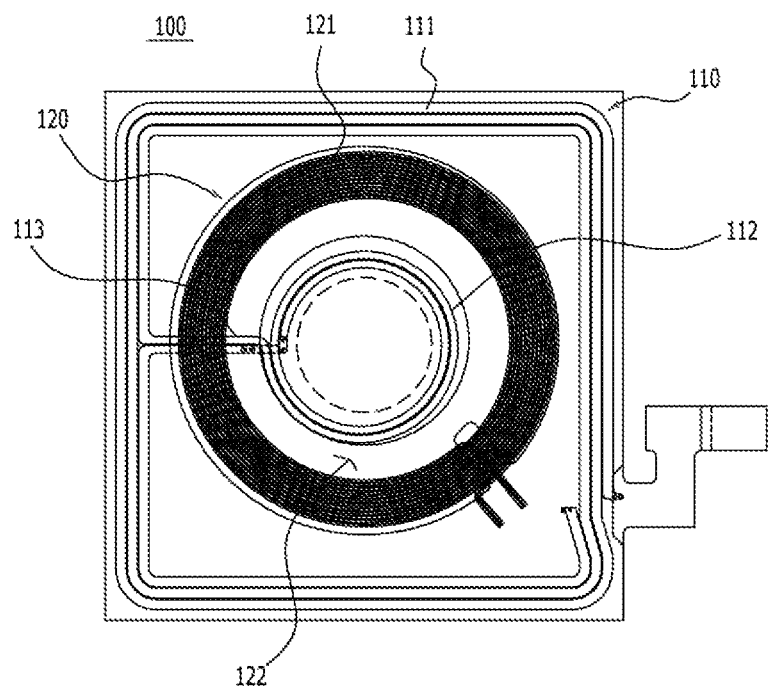

FIGS. 1 and 2 are cross-sectional views respectively illustrating an example of the antenna structure of a wireless antenna according to an embodiment.

As illustrated, the wireless antenna 100 according to an embodiment includes an NFC antenna 110 for near field communication (NFC) and a charging antenna 120 for wireless charging in connection with a coil of the NFC antenna 110.

The NFC antenna 110 includes a first coil member 111, which includes at least one first loop pattern 111 for NFC, and a second coil member 112, which is formed inside the first coil member 111 and includes at least one first loop pattern 112 in the same manner as the first coil member 111.

The first loop pattern has a structure in which several spiral patterns are wound in close contact with each other. For example, the first loop pattern of the first coil member 111 may include substantially rectangular spiral patterns, and the first loop pattern of the second coil member 112 may include substantially circular spiral patterns.

In conclusion, the first loop pattern of the first coil member 111 and the first loop pattern of the second coil member 112 may have the same spiral pattern structure, but may differ from each other in terms of the shape thereof. However, the disclosure is not limited thereto, and various modifications, for example, one in which both loop patterns have the same shape, are possible.

Here, the first loop pattern of the second coil member 112 may be limited as to the number of spiral patterns, unlike the first loop pattern of the first coil member 111.

This is because it is necessary to satisfy a resistance (R) value and/or a quality factor (Q) value, which are defined in standards of the Wireless Power Consortium (WPC) and/or the Power Matters Alliance (PMA).

In general, the R value is defined within a range from 4Ω to 6Ω, and the Q value is defined within a range from 23.00 to 27.00, as recommended in the standards of the WPC and/or the PMA.

Since efficiency may be deteriorated in terms of wireless charging and/or NFC recognition outside the ranges described above, the standards of the WPC and/or the PMA define the ranges as described above.

Thus, the first loop pattern of the second coil member 112 may be determined so that the number of spiral patterns is within both the ranges of the R value and/or the Q value described above.

For example, when the first loop pattern of the second coil member 112 includes one inner turn ("turn" means the number of times the coil is wound), this may be the optimum number in terms of wireless charging efficiency and/or NFC recognition efficiency.

In other words, when the first loop pattern of the second coil member 112 includes one inner turn, it may satisfy the R value and/or the Q value, thereby enhancing wireless charging efficiency and/or NFC recognition efficiency.

Meanwhile, an example of one inner turn is illustrated in FIG. 1, and an example of two inner turns is illustrated in FIG. 2. As noted above, one inner turn in FIG. 1 is superior to two inner turns in FIG. 2 in terms of the effect thereof.

On the other hand, in an embodiment, the charging antenna 120 is formed between the first coil member 111 and the second coil member 112 of the NFC antenna 110, in order to satisfy both antenna standards, which are recommended in the standards of the WPC and the PMA.

To this end, the charging antenna 120 may include an induction coil member 121, which includes at least one second loop pattern, and a coil periphery member 122, which forms the inner periphery of the induction coil member 121.

The second loop pattern has a structure in which several spiral patterns are wound in close contact with each other. For example, the second loop pattern of the induction coil member 121 may include substantially circular spiral patterns.

The coil periphery member 122 may have a size sufficient to cover the bottom of the induction coil member 121 so as to be larger than the inner circle and the outer circle when the induction coil member 121 has a circular shape.

For example, the coil periphery member 122 may form the outer periphery, which protrudes outwards from the circular induction coil member 121, and may also form the inner periphery, which protrudes inwards from the circular induction coil member 121.

Next, the NFC antenna 110 according to an embodiment may further include a coil connection member 113, which connects one side of the inner surface of the first coil member 111 and one side of the outer surface of the second coil member 112 to each other. As shown in FIG. 1, a width of a winding of the second coil member 112 is less than a width of a winding of the first coil member 111, and each of the windings of the first coil member 111 has a width greater than the width of the winding of the second wireless communication coil (e.g., the various dimensions are readily seen at the center left of FIG. 1, where the connection member 113 connects between the first coil member 111 and the second coil member 112).

Through the connection using the coil connection member 113 as described above, the first coil member 111 and the second coil member 112 may be electrically connected to each other so as to further activate the interchange of magnetic fields between the first coil member 111, the second coil member 112, and the induction coil member 121, which may increase NFC recognition efficiency and charging efficiency.

Moreover, in order to further increase NFC recognition efficiency and charging efficiency, the distance L between the second coil member 112 and the inner periphery of the coil periphery member 122 (hereinafter also referred to as an inner turn interval) may be determined within the range satisfying the resistance (R) value and/or the quality factor (Q) value, which are defined in the standards of the WPC and/or the PMA.

For example, when the R value, recommended in the standards of the WPC and/or the PMA, ranges from 4Ω to 6Ω, or when the Q value, recommended in the standards of the WPC and/or the PMA, ranges from 23.00 to 27.00, the distance L may range from 40 μm to 70 μm to satisfy the R value or the Q value.

The suitability therefor will be sufficiently described later with reference to FIGS. 4 and 5.

<Embodiment of Connection Structure>

Figure 3:
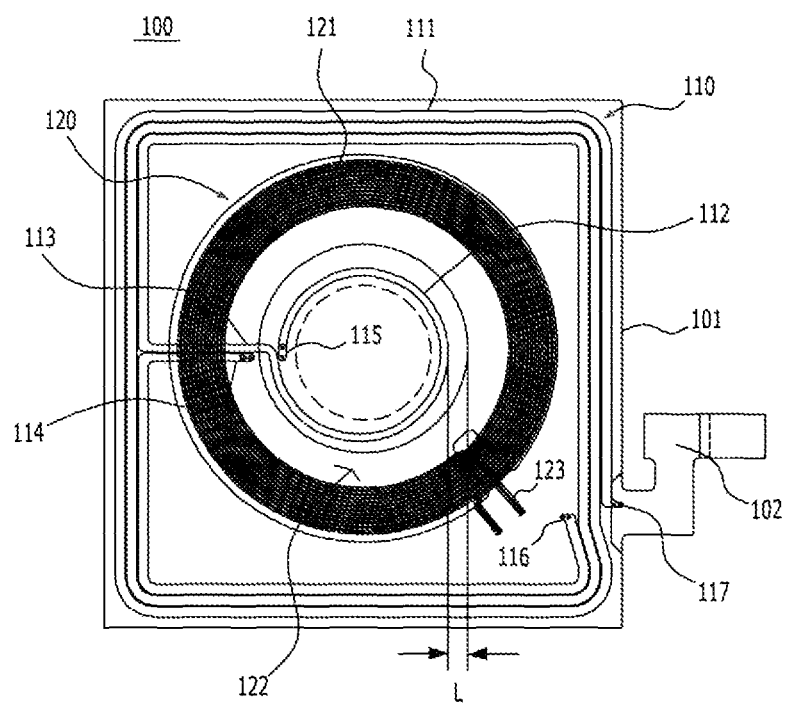
FIG. 3 is a cross-sectional view illustrating the connection structure of the wireless antenna illustrated in FIG. 1.

FIG. 3 is a cross-sectional view illustrating the connection structure of the wireless antenna illustrated in FIG. 1. Reference numerals illustrated in FIG. 3 designate the same structure including the above-described reference numerals of FIG. 1.

Referring to FIG. 3, the wireless antenna 100 according to an embodiment may include the connection structure of the NFC antenna 110 and the connection structure of the charging antenna 120.

With regard to the connection structure of the NFC antenna 110, the first coil member 111 may further include a longitudinal end terminal 114, which extends from one side of the inner surface of the first coil member 111 and forms a first longitudinal end of the first coil member, and the second coil member 112 may further include a second longitudinal end terminal 115, which is wound by the number of inner turns and is formed on the longitudinal end of the second coil member.

The longitudinal end terminal 114 may be spaced apart from the second coil member 112, but may extend from the inner side of the first coil member 111, rather than being connected to one side of the inner surface of the first coil member 111 and to one side of the outer surface of the second coil member 112.

In this case, the second longitudinal end terminal 115 may be in electrical contact with the longitudinal end terminal 114. This contact structure may contribute to an increase in NFC recognition efficiency and charging efficiency.

In addition, the connection structure of the NFC antenna 110 may further include an inner connection terminal 116, which is formed on the other inner longitudinal end of the last spiral pattern of the first loop pattern formed on the inner surface of the first coil member 111.

The connection terminal 116 may be in electrical contact with a connection terminal 117, which is formed on the outer longitudinal end of the first coil member 111.

In an embodiment, the connection structure of the charging antenna 120 may further include a connection terminal 123, which is in electrical contact with a battery, in order to transmit electric power, which is generated via the magnetic-induction-type magnetic field between the NFC antenna 110 and the charging antenna 120, to the battery.

The connection terminal 123 of the charging antenna 120 may be formed in the direction in which it crosses the second loop pattern having a spiral shape.

However, the disclosure is not limited thereto, and the charging antenna may be positioned in various ways depending on the inner structure of an object on which the wireless antenna 100 is mounted (e.g. a mobile terminal, a wearable device, or the like). Moreover, needless to say, the connection structure of the NFC antenna 110 may have various other contact structures depending on the inner structure or shape of the object.

Meanwhile, the wireless antenna 100 described above may be formed (printed) on a flexible printed circuit board 101. In this case, each connection structure of the wireless antenna 100 may be electrically connected to a connector 102, which is formed on the flexible printed circuit board 101. The connector 102 may be electrically connected to, for example, an NFC chip, which is provided inside the object.

Comparative Example 1

Figure 4:
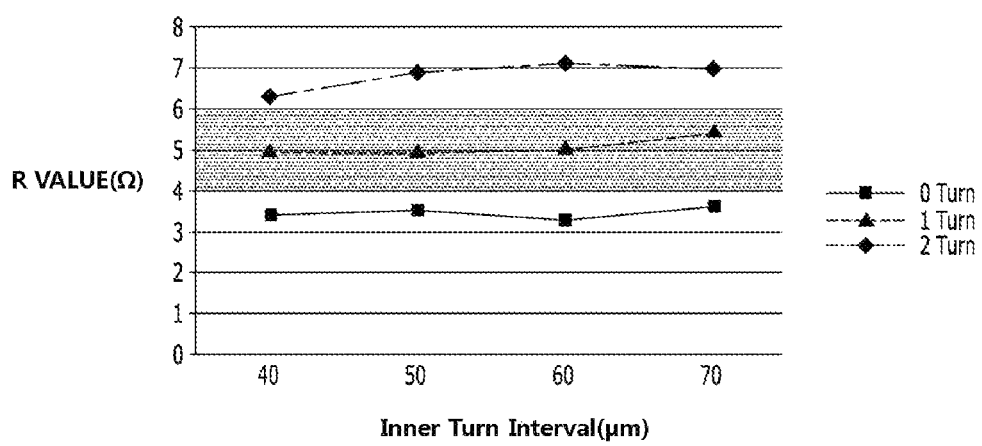
FIG. 4 is a graph illustrating the R value compared with the inner turn interval depending on the number of inner turns of FIGS. 1 and 2.

FIG. 4 is a graph illustrating the R value compared with the inner turn interval depending on the number of inner turns of FIGS. 1 and 2.

Referring to FIG. 4, when the number of inner turns is zero, the R value ranges from 3Ω to 4Ω to correspond to the optimally determined range of the inner turn interval from 40 μm to 70 μm. When the number of inner turns is one, which is optimal, the R value ranges from 4Ω to 6Ω to correspond to the determined range of the inner turn interval from 40 μm to 70 μm.

On the other hand, it can be seen that, when the number of inner turns is two, the R value ranges from 6Ω to 8Ω to correspond to the optimally determined range of the inner turn interval from 40 μm to 70 μm.

Here, since the R value must range from 6Ω to 8Ω as recommended in the standards of the WPC and/or the PMA, NFC recognition efficiency and charging efficiency could be increased under the specification in which the inner turn interval ranges from 40 μm to 70 μm and one inner turn is provided to satisfy the above-described range of the R value.

It can be appreciated that this increase in efficiency results from the structure of the NFC antenna 110 described with reference to FIGS. 1 and 2 as well as the above-described specification in which the inner turn interval ranges from 40 μm to 70 μm and one inner turn is provided.

The other two specifications with regard to the inner turn interval and the number of inner turns do not satisfy the R value recommended in the standards of the WPC and/or the PMA, and thus inevitably cause deterioration in NFC recognition efficiency and charging efficiency.

Comparative Example 2

Figure 5:
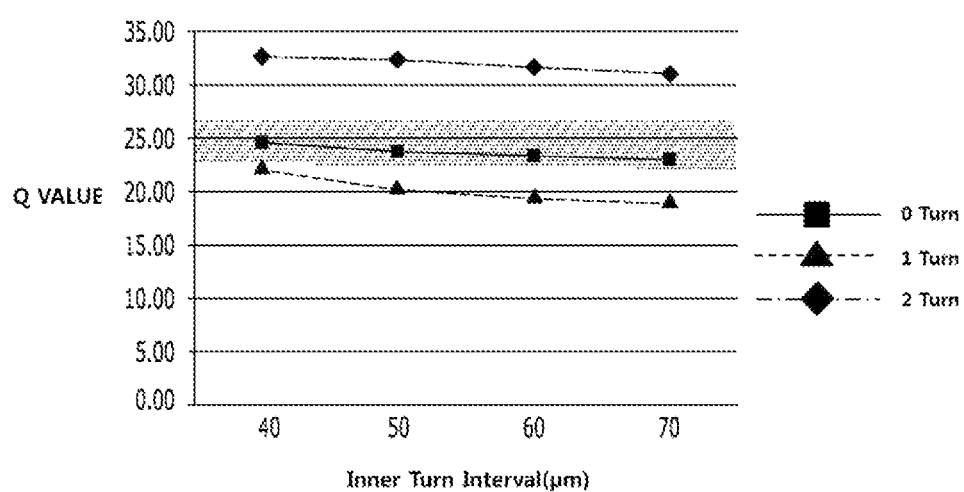
FIG. 5 is a graph illustrating the comparison result between the Q value and the inner turn interval of FIGS. 1 and 2.

FIG. 5 is a graph illustrating the comparison result between the Q value and the inner turn interval of FIGS. 1 and 2.

Referring to FIG. 5, when the number of inner turns is two, the Q value ranges from 17 to 22 to correspond to the optimally determined range of the inner turn interval from 40 μm to 70 μm. When the number of inner turns is one, which is optimal, the Q value ranges from 23 to 27 to correspond to the determined range of the inner turn interval from 40 μm to 70 μm.

On the other hand, it can be seen that, when the number of inner turns is zero, the Q value ranges from 30 to 33 to correspond to the optimally determined range of the inner turn interval from 40 μm to 70 μm.

Here, since the Q value must range from 23 to 27 as recommended in the standards of the WPC and/or the PMA, NFC recognition efficiency and charging efficiency could be increased under the specification in which the inner turn interval ranges from 40 μm to 70 μm and one inner turn is provided, which satisfies this range.

The other two specifications with regard to the inner turn interval and the number of inner turns do not satisfy the Q value recommended in the standards of the WPC and/or the PMA, and thus inevitably cause deterioration in NFC recognition efficiency and charging efficiency.

<Embodiment of Wireless Terminal>

Figure 6:
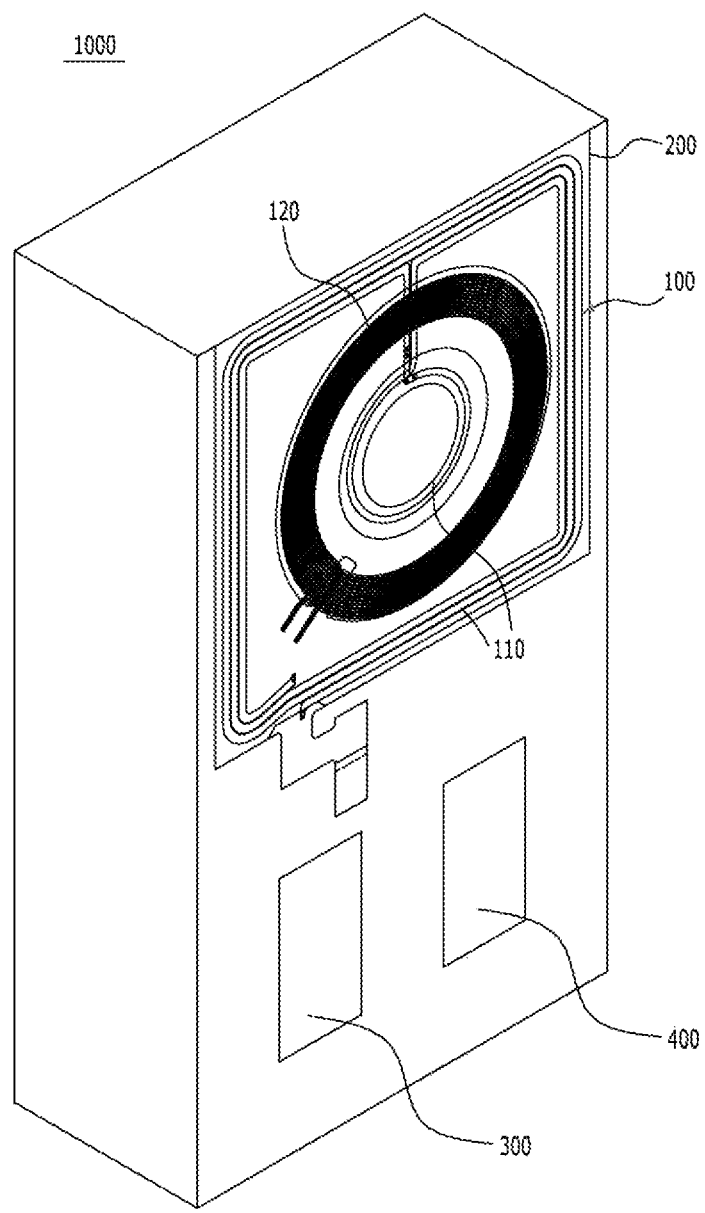
FIG. 6 is a schematic view illustrating one example of a wireless terminal to which the wireless antenna of FIG. 1 is applied.

FIG. 6 is a schematic view illustrating one example of a wireless terminal to which the wireless antenna of FIG. 1 is applied.

Referring to FIG. 6, the wireless terminal 1000 according to an embodiment includes the wireless antenna 100, a flexible printed circuit board (FPCB) 200, a battery 300, and an NFC chip 400. The wireless antenna 100 has sufficiently been described above with reference to FIGS. 1 to 5, and thus, a description thereof will be omitted below, but the above description may be equally applied to the present embodiment.

First, the flexible printed circuit board 200 is disposed in a given direction inside the wireless terminal 1000 so that loop patterns of the wireless antenna 100 are formed thereon. The flexible printed circuit board 200 may be mounted inside a battery pack.

The battery 300 serves to store therein electric power transmitted from the wireless antenna 100. The battery 300 may be a detachable battery or a fixed battery.

Finally, the NFC chip 400 supplies electric power to the NFC antenna 110 and transmits and receives communication data to and from the NFC antenna. The NFC chip 400 may include at least one of a tag or a reader.

For example, when an external device (not illustrated), which performs NFC with the wireless terminal 100, is a reader, the NFC chip 400 may operate as a tag. When the external device operates as a tag, the NFC chip 400 may operate as a reader. However, the NFC chip 400 may operate as both the tag and the reader.

Thus, the NFC chip 400 may read data recorded in the tag and/or the reader.

Meanwhile, the wireless terminal 1000 described in the present embodiment may receive various Internet services via NFC, and may be applied to a mobile terminal, which enables wireless charging during movement.

However, the disclosure is not limited thereto, and it can be said that any other wireless device in which both wireless charging and NFC need to be implemented falls within the scope of the wireless terminal described in the present embodiment. For example, the wireless terminal may be a large-scale wireless device such as an automobile wireless device as well as a portable wireless device such as an MP3 player or a wearable device.

<Another Embodiment of Wireless Terminal>

Figure 7:
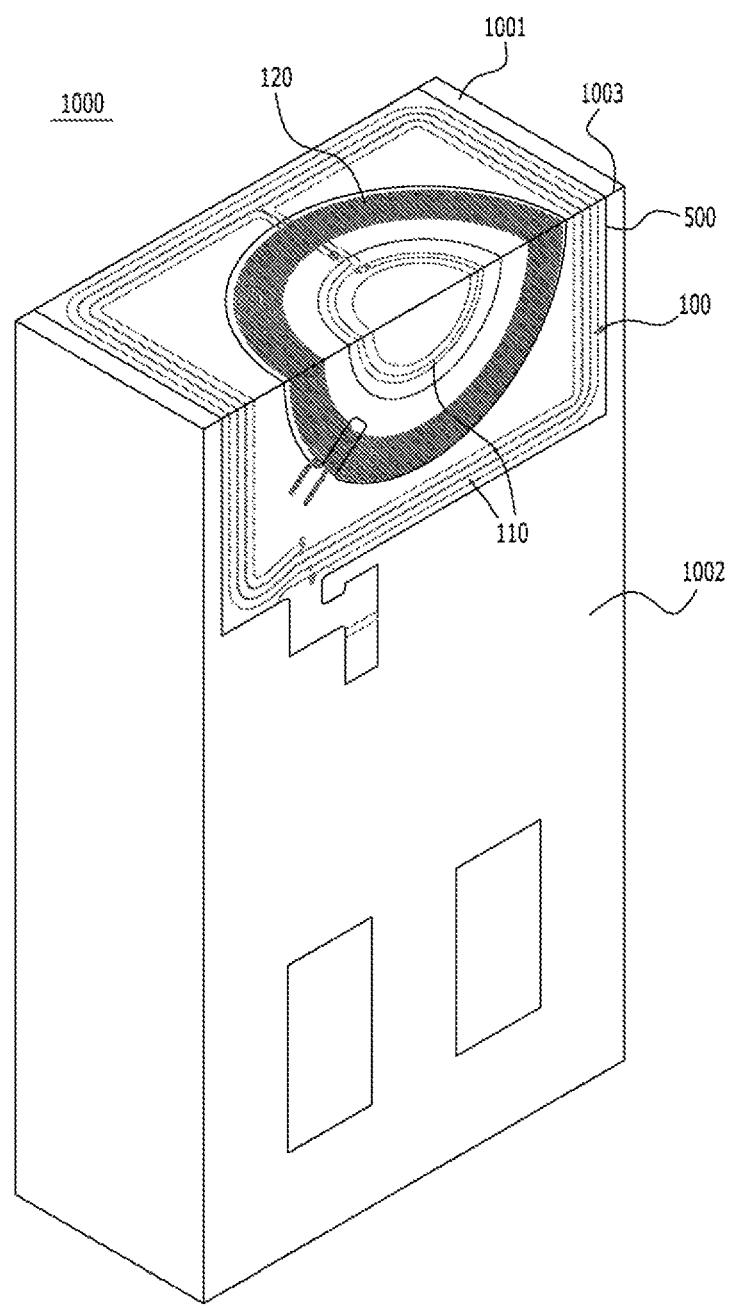
FIG. 7 is a schematic view illustrating another example of a wireless terminal to which the wireless antenna of FIG. 1 is applied.

FIG. 7 is a schematic view illustrating another example of a wireless terminal to which the wireless antenna of FIG. 1 is applied.

Referring to FIG. 7, the wireless terminal 1000 according to an embodiment includes the wireless antenna 100, which simultaneously supports wireless charging and NFC, a flexible printed circuit board (FPCB) 500 on which the wireless antenna 100 is mounted, the battery 300, which stores therein electric power generated in the wireless antenna 100, and the NFC chip 400, which supplies electric power to the NFC antenna 110 provided in the wireless antenna 100 and transmits and receives communication data to and from the NFC antenna 110.

Here, the flexible circuit board 500 may be the same as the structure of the flexible printed circuit board 200 described in FIG. 6 in terms of the function thereof, but may have a difference therebetween in that, when the wireless terminal 1000 is provided with a bent region 1001, the flexible circuit board is divided and provided on, for example, an upper surface 1002 and a rear surface 1003 of the wireless terminal 1000.

A portion of the flexible printed circuit board 500 and the wireless antenna 100 may be disposed on the upper surface 1002 of the wireless terminal 1000, and the remaining portion of the flexible printed circuit board 500 and the wireless antenna 100 may be disposed on the rear surface 1003 of the wireless terminal 1000.

However, the bending and placement position of the wireless antenna 100 described above are merely given by way of example, and it may be important for the wireless antenna to be disposed in the bent state.

The reason for this placement is to allow the wireless antenna to be easily applied to a compact wireless terminal such as the small wireless terminal 1000 or the flexible wireless terminal 1000.

Thereby, in the present embodiment, the wireless antenna 100 is bent and placed over several surfaces, thus having increased applicability to various kinds of wireless terminals.

Although embodiments have been described above with reference to the accompanying drawings, it will be apparent to those skilled in the art that the embodiments may be realized in other particular forms within a range that does not deviate from the spirit and essential features of the embodiments. Thus, the above detailed description should not be construed as being limited in all terms, but should be considered to be exemplary.

Embodiments described above may be applied to a terminal that requires wireless charging, for example, a cellular phone, a smart phone, a smart pad, a notebook, a table PC, a laptop computer, a digital broadcasting terminal, a personal digital assistant (PDA), a portable multimedia player (PMP), and the like. However, those skilled in the art will easily appreciate that the disclosure is not limited thereto, and may also be applied to a terminal installed in a vehicle, and the like.

What is claimed is:

1. A wireless antenna comprising;
   a wireless communication antenna comprising a first wireless communication coil and a second wireless communication coil; and
   a wireless charging antenna comprising a wireless charging coil,
   wherein the wireless charging coil is disposed inside the first wireless communication coil, and the second wireless communication coil is disposed inside the wireless charging coil,
   wherein the wireless communication antenna further comprises a coil connection member traversing the wireless charging coil so as to interconnect the first wireless communication coil and the second wireless communication coil,
wherein a number of windings of the second wireless communication coil is less than a number of windings of the first wireless communication coil, and
wherein a width of a winding of the second wireless communication coil is less than a width of a winding of the first communication coil.

2. The wireless antenna according to claim 1, wherein the first wireless communication coil and the second wireless communication coil have different shapes.

3. The wireless antenna according to claim 2, wherein a shape of the first wireless communication coil is a polygonal loop pattern, and
wherein a shape of the second wireless communication coil is a circular loop pattern.

4. The wireless antenna according to claim 1, wherein the first wireless communication coil and the second wireless communication coil have different curvatures.

5. The wireless antenna according to claim 1, wherein the wireless charging coil and the second wireless communication coil have corresponding curvatures.

6. The wireless antenna according to claim 1, wherein the number of windings of the second wireless communication coil is one.

7. The wireless antenna according to claim 1, wherein a number of windings of the wireless charging coil is greater than the number of windings of the first wireless communication coil.

8. The wireless antenna according to claim 7, wherein the number of windings of the wireless charging coil is greater than the number of windings of the second wireless communication coil.

9. The wireless antenna according to claim 1, wherein the coil connection member is insulated from the wireless charging coil.

10. The wireless antenna according to claim 1, wherein the first wireless communication coil and the second wireless communication coil are connected to each other in series, and
wherein the first wireless communication coil and the second wireless communication coil are wound so as to have a same rotational direction of current.

11. The wireless antenna according to claim 1, wherein the wireless communication antenna and the wireless charging antenna are formed on a flexible printed circuit board.

12. The wireless antenna according to claim 11, wherein the flexible printed circuit board further comprises a connector connected to the wireless communication antenna and to the wireless charging antenna.

13. The wireless antenna according to claim 1, further comprising a coil periphery member on which the wireless charging coil is disposed.

14. The wireless antenna according to claim 13, wherein the second wireless communication coil is disposed inside the coil periphery member.

15. The wireless antenna according to claim 13, wherein the coil connection member overlaps the coil periphery member.

16. The wireless antenna according to claim 13, wherein an area of the coil periphery member is larger than an area of the wireless charging coil.

17. A wireless antenna comprising;
a wireless communication antenna comprising a first wireless communication coil and a second wireless communication coil; and
a wireless charging antenna comprising a wireless charging coil,
wherein the wireless charging coil is disposed inside the first wireless communication coil, and the second wireless communication coil is disposed inside the wireless charging coil,
wherein a number of windings of the second wireless communication coil is less than a number of windings of the first wireless communication coil,
wherein a minimum distance between the second wireless communication coil and the wireless charging coil is greater than a minimum distance between the first wireless communication coil and the wireless charging coil, and
wherein a width of a winding of the second wireless communication coil is less than a width of a winding of the first communication coil.

18. The wireless antenna according to claim 17, wherein the first wireless communication coil and the second wireless communication coil have different shapes.

19. The wireless antenna according to claim 18, wherein a shape of the first wireless communication coil is a polygonal loop pattern, and
wherein a shape of the second wireless communication coil is a circular loop pattern.

20. The wireless antenna according to claim 17, wherein the first wireless communication coil and the second wireless communication coil have different curvatures.

21. The wireless antenna according to claim 17, wherein the wireless charging coil and the second wireless communication coil have corresponding curvatures.

22. The wireless antenna according to claim 17, wherein the number of windings of the second wireless communication coil is one.

23. The wireless antenna according to claim 17, wherein a number of windings of the wireless charging coil is greater than the number of windings of the first wireless communication coil.

24. The wireless antenna according to claim 23, wherein the number of windings of the wireless charging coil is greater than the number of windings of the second wireless communication coil.

25. The wireless antenna according to claim 17, wherein the wireless communication antenna further comprises a coil connection member traversing the wireless charging coil so as to interconnect the first wireless communication coil and the second wireless communication coil.

26. The wireless antenna according to claim 25, wherein the coil connection member is insulated from the wireless charging coil.

27. The wireless antenna according to claim 17, wherein the first wireless communication coil and the second wireless communication coil are connected to each other in series, and
wherein the first wireless communication coil and the second wireless communication coil are wound in a same rotational direction of current.

28. The wireless antenna according to claim 17, wherein the wireless communication antenna and the wireless charging antenna are formed on a flexible printed circuit board.

29. The wireless antenna according to claim 28, wherein the flexible printed circuit board further comprises a connector connected to both the wireless communication antenna and the wireless charging antenna.

30. The wireless antenna according to claim 25, further comprising a coil periphery member on which the wireless charging coil is disposed.

31. The wireless antenna according to claim 30, wherein the second wireless communication coil is disposed inside the coil periphery member.

32. The wireless antenna according to claim 30, wherein the coil connection member is disposed so as to overlap the coil periphery member.

33. The wireless antenna according to claim 30, wherein an area of the coil periphery member is larger than an area of the wireless charging coil.

34. A wireless antenna comprising;
a wireless communication antenna comprising a first wireless communication coil having a polygonal loop pattern and a second wireless communication coil having a circular loop pattern; and
a wireless charging antenna comprising a wireless charging coil having a circular loop pattern,
wherein the wireless charging coil is disposed inside the first wireless communication coil, and the second wireless communication coil is disposed inside the wireless charging coil,
wherein the wireless communication antenna further comprises a coil connection member traversing the wireless charging coil so as to interconnect the first wireless communication coil and the second wireless communication coil,
wherein a minimum distance between the second wireless communication coil and the wireless charging coil is greater than a minimum distance between the first wireless communication coil and the wireless charging coil, and
wherein a width of a winding of the second wireless communication coil is less than a width of a winding of the first communication coil.

35. The wireless antenna according to claim 34, wherein the first wireless communication coil and the second wireless communication coil have different curvatures.

36. The wireless antenna according to claim 34, wherein the wireless charging coil and the second wireless communication coil have corresponding curvatures.

37. The wireless antenna according to claim 34, wherein a number of windings of the wireless charging coil is different from a number of windings of the second wireless communication coil.

38. The wireless antenna according to claim 34, wherein a number of windings of the second wireless communication coil is one.

39. The wireless antenna according to claim 34, wherein a number of windings of the second wireless communication coil is less than a number of windings of the wireless charging coil.

40. The wireless antenna according to claim 39, wherein the number of windings of the wireless charging coil is greater than a number of windings of the first wireless communication coil.

41. The wireless antenna according to claim 40, wherein the number of windings of the wireless charging coil is greater than the number of windings of the second wireless communication coil.

42. The wireless antenna according to claim 34, wherein the coil connection member is insulated from the wireless charging coil.

43. The wireless antenna according to claim 34, wherein the first wireless communication coil and the second wireless communication coil are connected to each other in series, and
wherein the first wireless communication coil and the second wireless communication coil are wound so as to have a same rotational direction of current.

44. The wireless antenna according to claim 34, wherein the wireless communication antenna and the wireless charging antenna are formed on a flexible printed circuit board.

45. The wireless antenna according to claim 44, wherein the flexible printed circuit board further comprises a connector connected to both the wireless communication antenna and the wireless charging antenna.

46. The wireless antenna according to claim 34, further comprising a coil periphery member on which the wireless charging coil is disposed.

47. The wireless antenna according to claim 46, wherein the second wireless communication coil is disposed inside the coil periphery member.

48. The wireless antenna according to claim 46, wherein the coil connection member is disposed so as to overlap the coil periphery member.

49. The wireless antenna according to claim 46, wherein an area of the coil periphery member is larger than an area of the wireless charging coil.

50. The wireless antenna according to claim 1, wherein each of the windings of the first communication coil has a width that is greater than the width of the winding of the second wireless communication coil.

51. The wireless antenna according to claim 17, wherein each of the windings of the first communication coil has a width that is greater than the width of the winding of the second wireless communication coil.

52. The wireless antenna according to claim 34, wherein each of the windings of the first communication coil has a width that is greater than the width of the winding of the second wireless communication coil.

53. The wireless antenna according to claim 13, wherein a portion of the first wireless communication coil is disposed outside the coil periphery member.

54. The wireless antenna according to claim 13, wherein the coil periphery member outwardly extends beyond an outer boundary of the wireless charging coil, and the coil periphery member inwardly extends beyond an inner boundary of the wireless charging coil.

55. The wireless antenna according to claim 13, wherein the coil periphery member includes a notched portion disposed adjacent to an inner corner of the first wireless communication coil, a portion of the notched portion being located outside of the wireless charging coil and without overlapping the wireless charging coil.

* * * * *